(12) United States Patent
Sattler

(10) Patent No.: US 9,559,781 B2
(45) Date of Patent: Jan. 31, 2017

(54) PROCESS FOR THE DETECTION OF OPTICAL SIGNALS

(71) Applicant: Dräger Medical GmbH, Lübeck (DE)

(72) Inventor: Frank Sattler, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 29 days.

(21) Appl. No.: 14/416,857

(22) PCT Filed: Jul. 8, 2013

(86) PCT No.: PCT/EP2013/064344
§ 371 (c)(1),
(2) Date: Jan. 23, 2015

(87) PCT Pub. No.: WO2014/016103
PCT Pub. Date: Jan. 30, 2014

(65) Prior Publication Data
US 2015/0180585 A1 Jun. 25, 2015

(30) Foreign Application Priority Data

Jul. 25, 2012 (DE) ........................ 10 2012 014 715

(51) Int. Cl.
| *H04B 10/43* | (2013.01) |
| *H04B 10/60* | (2013.01) |
| *H05B 33/08* | (2006.01) |
| *H05B 37/02* | (2006.01) |

(52) U.S. Cl.
CPC ............ *H04B 10/60* (2013.01); *H05B 33/083* (2013.01); *H05B 33/0827* (2013.01); *H05B 33/0854* (2013.01); *H05B 37/0272* (2013.01); *H05B 37/0281* (2013.01)

(58) Field of Classification Search
CPC ...................................................... H04B 10/43
See application file for complete search history.

(56) References Cited

U.S. PATENT DOCUMENTS

| 4,810,937 A | 3/1989 | Havel |
| 7,393,128 B2 | 7/2008 | Sakai et al. |
| 2006/0028156 A1 | 2/2006 | Jungwirth |
| 2006/0262530 A1* | 11/2006 | Sakai .................. G02B 6/0068 362/231 |
| 2008/0285820 A1* | 11/2008 | Voelker ................ F21V 21/403 382/128 |

(Continued)

FOREIGN PATENT DOCUMENTS

| CN | 100435004 C | 11/2008 |
| DE | 10 2004 056705 A1 | 4/2006 |

(Continued)

OTHER PUBLICATIONS

Chinese Search Report of Jan. 26, 2016.

*Primary Examiner* — Shi K Li
(74) *Attorney, Agent, or Firm* — McGlew and Tuttle, P.C.

(57) ABSTRACT

A process for the detection of optical signals with a light module (10) with at least two light sources (20) operated with on/off times with at least one LED (30). The process includes the steps of operating the at least two light sources (20) with time-shifted on/off times and detecting optical signals with the light source (20) that occurs in the off time at the given time.

20 Claims, 3 Drawing Sheets

(56) References Cited

U.S. PATENT DOCUMENTS

| | | | |
|---|---|---|---|
| 2009/0189530 A1* | 7/2009 | Ashdown | H05B 33/0818 |
| | | | 315/152 |
| 2009/0321666 A1 | 12/2009 | Hilgers | |
| 2010/0182294 A1* | 7/2010 | Roshan | G01J 1/32 |
| | | | 345/207 |
| 2010/0264835 A1 | 10/2010 | Bilenko et al. | |
| 2011/0304599 A1 | 12/2011 | Yasui | |

FOREIGN PATENT DOCUMENTS

| | | |
|---|---|---|
| DE | 10 2006 023694 A1 | 11/2006 |
| EP | 1 410 949 A2 | 4/2004 |
| EP | 1956869 A2 | 8/2008 |
| EP | 2 074 658 B1 | 3/2010 |
| JP | 2007 227 184 A | 9/2007 |

* cited by examiner

PROCESS FOR THE DETECTION OF OPTICAL SIGNALS

CROSS REFERENCE TO RELATED APPLICATIONS

This application is a United States National Phase application of International Application PCT/EP2013/064344 filed Jul. 8, 2013 and claims the benefit of priority under 35 U.S.C. §119 of German Patent Application DE 10 2012 014 715.5 filed Jul. 25, 2012, the entire contents of which are incorporated herein by reference.

FIELD OF THE INVENTION

The present invention pertains to a process for the detection of optical signals with a light module, a light module for the detection of optical signals, as well as to the use of such a light module for a lighting fixture for an operating room.

BACKGROUND OF THE INVENTION

Processes for the detection of optical signals are basically known. For example, light modules of illuminating devices have additional detectors in order to detect optical signals. For example, a feedback concerning a reflected amplitude from such a detector can be recognized. If an illumination area is defined for an illuminating device, it may be useful to obtain a feedback concerning the illumination situation. Based on this feedback the illumination can be adjusted, so that, e.g., individual shadows can be compensated by shadowing objects. Separate detectors, which can detect the optical signals, especially the light emitted by other light sources, are necessary for this in prior-art light modules.

The drawback of prior-art processes and prior-art light modules is that the detection must be carried out by additional components in the form of additional detectors. These require additional space for their installation, as a result of which the overall size of prior-art light modules is increased. In addition, additional components in the form of detectors lead to additional costs and additional expenses for materials. Another drawback arises because the additional detectors do not have exactly the same optical viewing direction, which may be especially disturbing in case of close objects.

SUMMARY OF THE INVENTION

An object of the present invention is to eliminate the above-described drawbacks at least partially. An object of the present invention is, in particular, to make available a process for the detection of optical signals with a light module, such a light module for the detection of optical signals as well as the use of a light module for a lighting fixture for an operating room, which make it possible to perform a preferably continuous detection over time at low costs and with a low design effort in a cost-effective and simple manner.

A process according to the present invention for the detection of optical signals is used for a light module with at least two light sources operated with on/off times with at least one LED each. Such a process has the following steps according to the present invention:

Operation of the at least two light sources with time-shifted on/off times,

Detection of the optical signals with the light source, which is always during the off time.

Features and details that are described in connection with the process according to the present invention also apply, of course, in connection with the light module according to the present invention and the use of a light module according to the present invention and vice versa in each case, so that reference is or can always be made mutually to the individual aspects of the present invention concerning the disclosure.

The light sources of the light module also have a secondary function in the process according to the present invention besides their main function of emitting light. This secondary function is the detection of optical signals, i.e., for example, the detection of amplitudes of received light. The present invention is based here on the principle that LEDs, especially some LED types designed for this purpose, can also be used as radiation receivers or photodetectors. These light sources thus have a dual function, so that the additional cost and additional design effort for separate detectors, as they are used in prior-art illuminating devices, can be avoided.

A process according to the present invention eliminates, moreover, the drawback that an LED, which shall emit light as a light source and detect optical signals, can always assume only one of these functions at the same time. At least two light sources are provided for this in the light module in the process according to the present invention. These are operated with time-shifted on/off times, so that at least one of the two light sources is always in the off state, i.e., in the off time.

So-called pulse width modulation is frequently used for brightness control in prior-art LEDs. This means that the LED is used for light emission over a certain percentage of the time (on time) only to set a defined brightness, rather than using a certain percentage of the maximum brightness of the LED. The LED is in the off state during a correspondingly correlating percentage of time (off time), so that no light is emitted. These hitherto unused off times are now used to detect signals. Based on the fact that at least two light modules operated with such on/off times with light sources are available in the light module, these two light sources can quasi mutually monitor each other, so that one of the two light sources is always available in the off state for the detection function. It is quasi possible in this manner that the light module with the at least two light sources operated with on/off times monitors itself.

The on/off times of the at least two light sources are designed to have a time shift preferably such that the off times of the at least two light sources do not overlap. However, the emitted signals and the detected signals of the at least two light sources are preferably identical. The detection function can thus always be assumed by the light source that is in the off time. Thus, one of the light sources is preferably always in the off state or in the off time for the entire light module, so that a quasi-continuous detection of the optical signals can be made available for the light module. This is a major advantage, because the LEDs already have a specific design concerning the type of light emitted by them. This specificity is correspondingly also present for a specific detection of the type of light emitted correspondingly within the optical signal detection function.

A light module according to the present invention may be used, for example, in an illuminating device, which has a plurality of light modules. Each of these light modules is provided in the manner according to the present invention with such a detection process function, so that, for example, shadowing effects of an illuminated area can be detected by this detection process. A compensating function can be made available for such shadowing situations in this manner at low cost and in a simple manner, so that non-shadowed light modules operate with a higher light intensity in order to additionally illuminate the shadowed area.

The offset in the time-shifted operation of the two light sources concerning their off times does not necessarily have to be a whole number. It is, however, important that one of the light sources is on and one of the light sources is off at least in some sections in order to make the time shift available concerning the possibility of detecting optical signals during the off time of one of the light sources. There is ideally a complete or essentially complete phase shift, so that at least one of the light sources is always in the off time. The duration of the off time, just as the duration of the on time during the control by pulse width modulation, depends on the desired light intensity. The higher the desired or required light intensity of the light module, the longer are the on times and the shorter are the off times, in which the detection process can be carried out. Consequently, the higher the maximum required light intensity, the higher must be the maximum number of the at least two light sources. A light module is consequently preferably selected or designed with respect to its maximum available light intensity output. The number of at least two light sources operated with on/off times will correspondingly also depend on the maximum light intensity and corresponding on the minimum corresponding off time during the pulse width modulation of these light sources.

A process according to the present invention can be improved by performing an analysis of the detected optical signals. With reference to the number of light sources, a correction factor is taken into account, which pertains as a correction factor m−1 to the number m of light sources. This correction factor stems from the fact that one of the light sources is always in the off state, namely, the detection state, during the detection. The signal of the own light module can correspondingly be detected only as amplitude, but according to the on/off pattern. Only the brightness of m−1 radiators is correspondingly taken into account as a summary brightness, and the determined percentage of the own light module concerning the measured amplitude is too low by the factor m−1/m. If this correction factor is taken into account, it is also possible to make a statement about the summary brightness, even though an own light source of the light module, which is in the off time at the time of the detection, is used.

Further, it may be advantageous if an analysis of the detected optical signals is performed in a process according to the present invention and the correction factor 1+1/V is taken into account with reference to the pulse to pause ratio V of the on time $T_1$ and off time $T_0$. The pulse to pause ratio V is defined here as follows:

$$V=T_1/T_0.$$

The correction factor defined above pertains to a defined and analyzed mean brightness of the light module. To make it also possible to correctly detect this mean brightness, the pulse to pause ratio of the light module is to be taken into account. Based on the fact that the measured amplitude has too narrow a distribution for one light source with respect to the mean brightness, namely, the light source that is in the detection state and hence in the off time, the measured amplitude is too high by a factor 1+1/V. If this factor is used as the correction factor, the mean brightness of the light module during illumination can also be additionally determined by a process according to the present invention without having to use an additional detector.

The present invention also pertains to a light module with at least two light sources operated with on/off times with at least one LED each. A light module according to the present invention is characterized in that at least one computer is provided, which operates the at least two light sources with time-shifted on/off times. Further, detection of optical signals is performed by the computer with the light source that happens to be in the off time. Such a light module may be used, for example, for an illuminating device, especially a lighting fixture for an operating room. The computer can correspondingly be used preferably to carry out a process according to the present invention, so that the same advantages that were explained in detail with respect to a process according to the present invention are obtained. The LED is correspondingly likewise controlled again by pulse width modulation with respect to the generation of a preset light intensity. At least one light source will always be in the off time due to the time-shifting mode of operation of the two light sources in respect to the on/off times, so that the secondary function of detecting optical signals can be carried out.

A light module according to the present invention can be improved such that the number m of light sources is provided as a function of the pulse to pause ratio V between on time $T_1$ and off time $T_0$ especially according to the following specification:

$$m=1+V, \text{ in which } V=T_1/T_0.$$

The above specification is decisive especially with respect to the design and control of the light module in terms of the division of corresponding light source subgroups. If a maximum pulse to pause ratio, which is obtained at the maximum required light intensity of the light module, is preset via the pulse to pause ratio, the maximum necessary number of light sources can be designed for this maximum. If, for example, a maximum pulse to pause ratio is provided at which the on time accounts for 75% and the off time for 25% of an on/off phase, the pulse to pause ratio is V=3. Four light sources will correspondingly be necessary, which are to be used in the light module according to the present invention or for a process according to the present invention. It can thus be ensured that a sufficient number of light sources will always be available to carry out a process according to the present invention. For example, an m of 10 is consequently obtained for a V of, for example, 9, i.e., an on time of up to 90% and an off time of 10%. Consequently, the number m should depend in practice on the maximum allowable value of V. However, regardless of the maximum value for the pulse to pause ratio, the necessary number of light sources operated with on/off times is at least two.

It is advantageous, further, if at least one detection device, which amplifies, passes on and/or analyzes the signals of the respective light source used for the detection, is provided. Such a detection device has especially a detection amplifier. The detection device is used to also make it possible to collect the detected signals. Thus, a single detection port, which is available as a connection interface for the computer or other analysis units, can be made available via the detection device. The downstream control may be performed, for example, in the detection device itself or even in separate control units or computers. In particular, an at least one-dimensional, especially two-dimensional signal communication takes place via the detection device with a control device and/or an analysis unit.

It is advantageous according to the present invention if the detection device in the light module according to the present invention has at least one detection amplifier for amplifying the detected signals. Facilitated analysis can thus be performed, because even slight differences in the detection of the optical signals will appear clearly and distinctly due to the amplification. In particular, a separate detection amplifier may be provided for every individual light source, and these detection amplifiers are connected with one another in a parallel arrangement.

Further, it is advantageous if the detection device in a light module according to the present invention has exactly one detection amplifier, which is in signal-communicating connection with the light sources via a switching device, This leads to a further reduction of the effort concerning the electronic components and assembly. Thus, only a single detection amplifier is necessary for all light sources. The switching device preferably has an individual switch for each light source, so that only the light source or light sources that is/are in the off time and hence in the detection state at the given time is/are connected with the detection amplifier at any time.

It may be advantageous within the framework of the present invention with reference to the explanations given in the above paragraph if the computer in the light module according to the present invention is designed to switch the switching device according to the time grid of the on/off times of the light sources. The switching of the on/off times of the light sources is thus correlated with the connection of the light sources to the detection amplifier. The same modulation frequency that is made available for the light sources may consequently also be used additionally as a modulation frequency for the switching device. It is used as a switching frequency of the switching device. It should be noted, in principle, that two or more light sources can also be brought simultaneously into the detection state in case of overlapping off times of individual light modules in order to detect optical signals. When using the detection device, a multiple measurement can be recognized in this manner, so that it is ensured that the result will not be distorted by two or more simultaneous signals of two or more light sources that are simultaneously in the detection state. The switching device may be designed, for example, as a multiplexer.

It is advantageous, moreover, if the computer in the light module according to the present invention is designed to perform a correction of the detected optical signals. The correction is performed, in particular, in respect to the summary brightness and/or the mean brightness of the light module. For example, the correction factor m−1 is used for the summary brightness, where m is the number of light sources. For example, the correction factor 1+1/V, in which V designates the pulse to pause ratio, is used for the mean brightness. Details regarding this were already explained with reference to the process according to the present invention.

A light module according to the present invention may be improved such that the computer is designed (configured) for carrying out a process according to the present invention. A light module according to the present invention correspondingly leads to the same advantage as that explained in detail with reference to a process according to the present invention.

The present invention also pertains to the use of a light module according to the present invention or of a process according to the present invention for a lighting fixture for an operating room. Since a plurality of light modules overlappingly illuminate a common illuminated area in such light fixtures for an operating room, shadowing effects caused by objects in the direction of the illuminated area can be compensated by light modules that are not switched off.

Detection of the current illumination situation, which can be made especially advantageously available by a process according to the present invention and a light module according to the present invention, becomes necessary due to the desired compensation.

The above invention will be explained in more detail on the basis of the drawing figures attached. The terms "left," "right," "top" and "bottom" used here pertain to an orientation of the drawing figures with normally readable reference numbers.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
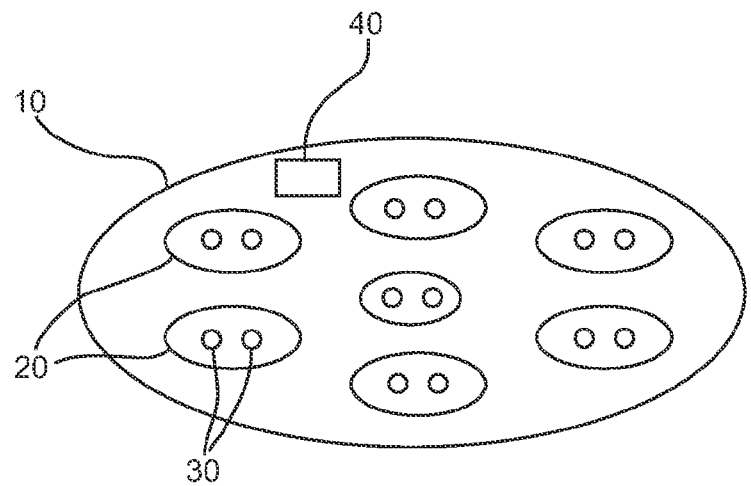
FIG. 2 is a view showing an embodiment of a light module according to the present invention.

Referring to the drawings, FIG. 2 shows an embodiment of the light module 10 according to the present invention, which has a total of seven light sources 20. Each of these light sources 20 is provided with two LEDs 30 in this embodiment. At least two light sources 20 with at least one LED 30 each are provided as the minimum according to the present invention. Further, the embodiment according to FIG. 2 has a computer 40, which is designed especially to carry out a process according to the present invention. This computer 40 also performs the pulse width modulation of the individual LEDs 30 in order to control the light intensity of the light module 10.

Figure 1:
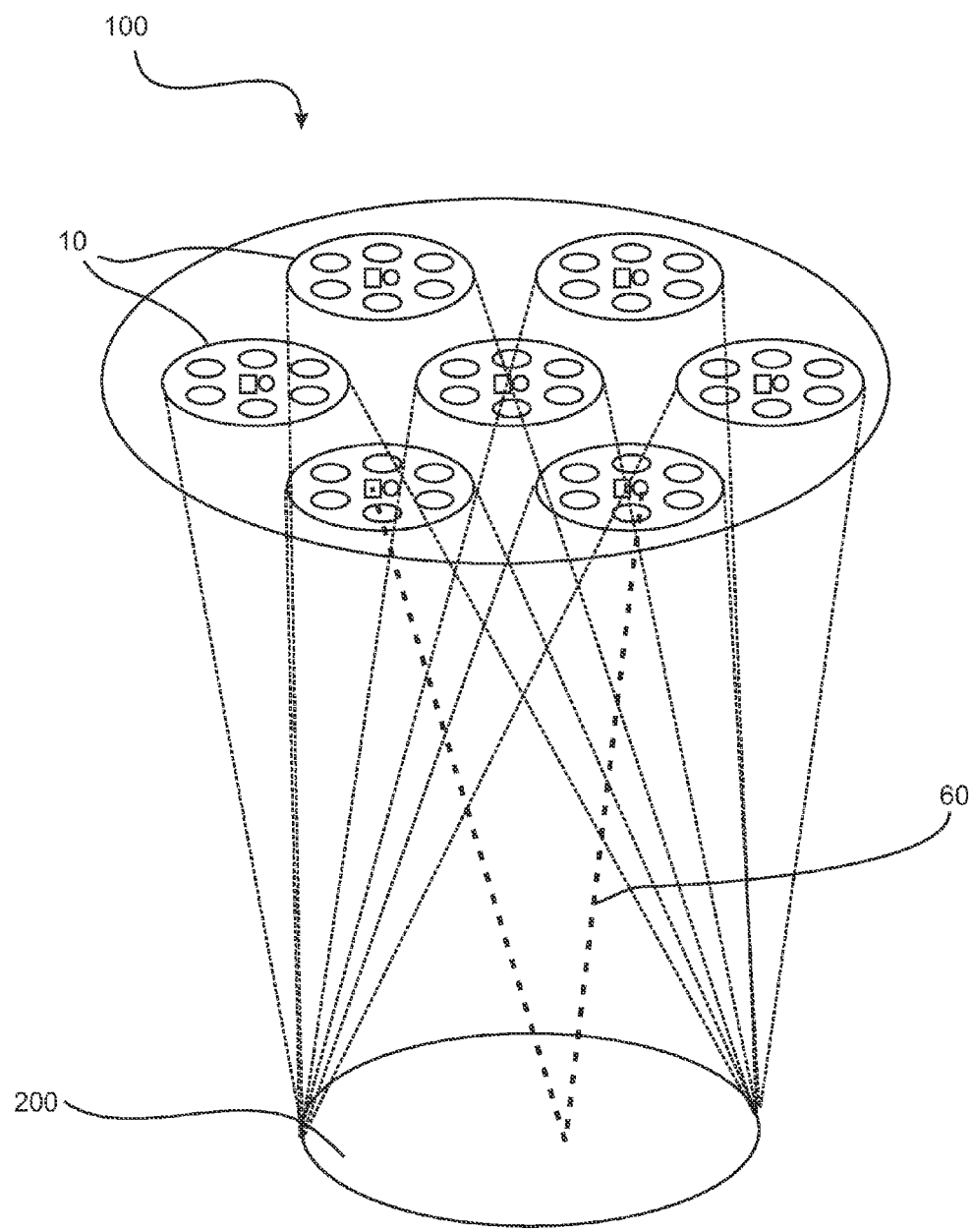
FIG. 1 is a view showing an embodiment of light modules according to the present invention in an illuminating device.

FIG. 1 shows an illuminating device 100 as it can be used, for example, as a lighting fixture for an operating room. A total of seven light modules 10, which may be designed especially according to FIG. 2, are provided in this embodiment. All light modules 10 illuminate an illuminated area 200 together and overlappingly. The detection beam path 60 is indicated by a broken line. Thus, the optical signal, i.e., for example, the light intensity, of other light modules 10 can be detected by a separate light module 10. It is, of course, also possible that a so-called self-detection takes place, namely, a light module 10 detects its own light intensity.

Light modules 10 corresponding to this embodiment do not have to have detectors of their own according to the present invention. The individual LEDs 30 are rather able, based on the design according to the present invention and the process according to the present invention, to detect optical signals themselves. They are therefore operated in a time-shifted manner in respect to their on/off time. This is shown, for example, in FIG. 3.

Figure 3:
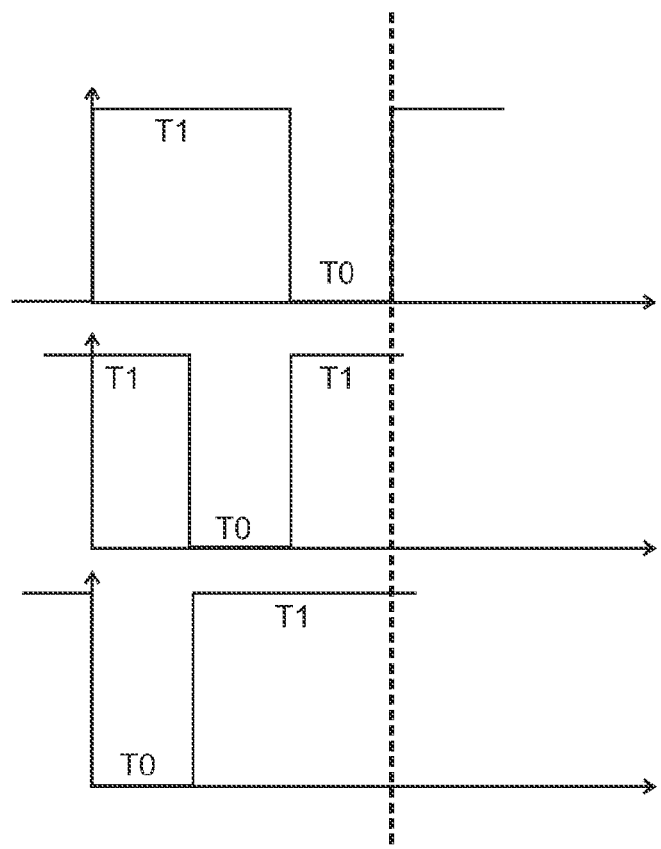
FIG. 3 is a view showing the time-shifted mode of operation of three light sources in the manner according to the present invention.

FIG. 3 shows the on/off time situation of three light sources 20. The topmost light source is in the on time $T_1$ from the beginning and in the off time $T_0$ at the end of the phase. The light source 20 in the middle is in the on time at the beginning of the phase and switches over to the off time in the middle in order to finally switch over to the on time. The third light source 20 is in the off time at the beginning of the phase to be in the on time for the rest of the phase. As can be recognized from the superimposed views of the individual pulse width modulations of the light sources 20, the situation of these light sources 20 is such that the off times $T_0$ do not overlap in time. Thus, one of the light sources 20 can always be used for the detection, so that self-detection can take place in the manner according to the present invention without additional detectors.

Figure 4:
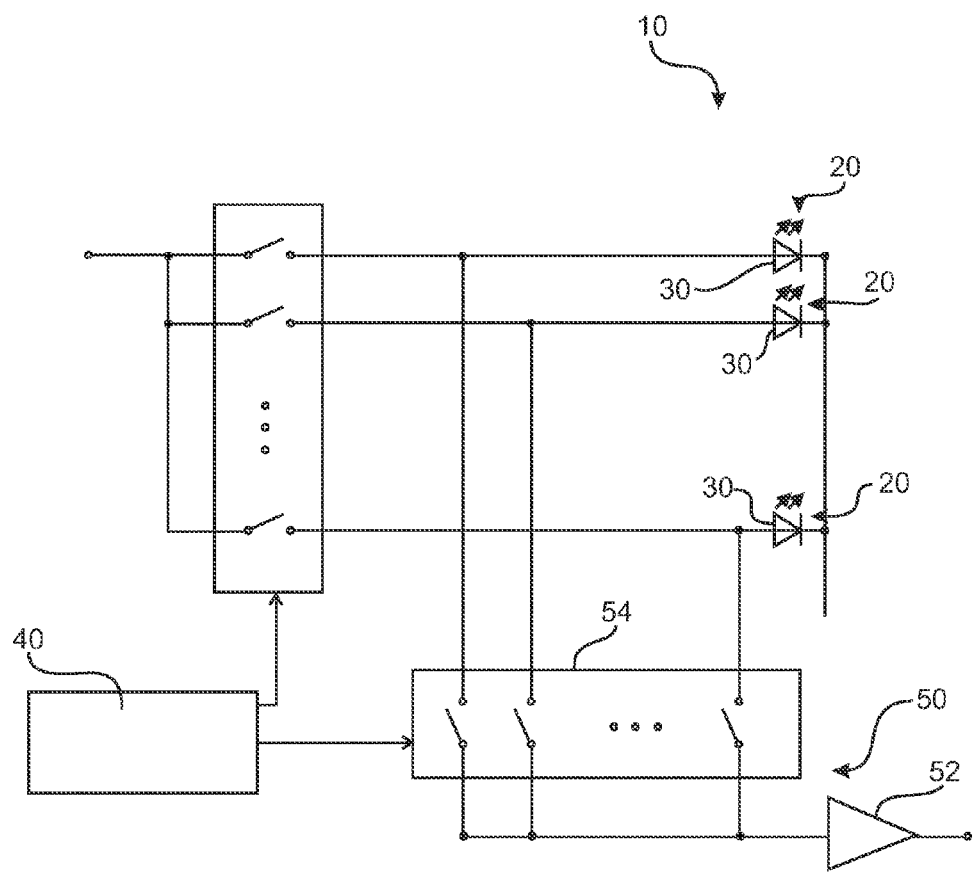
FIG. 4 is a view showing a schematic view of a circuit of a light module according to the present invention.

FIG. 4 shows an embodiment of a light module 10 according to the present invention with an indicated plurality of light sources 20, which have an LED 30 each. A box with individual switches, via which the pulse width modulation can be carried out, is shown on the left. The control is preferably carried out via the computer 40, which is connected with this switching box. Switching of the on times $T_1$ and off times $T_0$ of the individual LEDs 30 can thus take place. In addition, a detection device 50 is provided, which has a single detection amplifier 52 in this embodiment. This amplifier 52 is connected with all LEDs 30 via a switching device 54. The switching device 54 can likewise be controlled by the computer 40 in a signal-communicating manner. The pulse width modulation frequency is preferably used for the control of the switching device 54 in order to make the switching frequency available. It can thus be achieved that the detection amplifier 52 is always in signal-communicating connection with the LED or LEDs 30 that is/are in the off state or in the off time at the given time. This leads to the possibility of performing the detection continuously with a single detection amplifier 52 for all LEDs 30 that are in the off state.

This explanation of the embodiments describes the present invention only within the framework of examples. Individual features of the embodiments, if technically meaningful, may, of course, be freely combined with one another without going beyond the scope of the present invention.

While specific embodiments of the invention have been shown and described in detail to illustrate the application of the principles of the invention, it will be understood that the invention may be embodied otherwise without departing from such principles.

The invention claimed is:

1. A process for the detection of optical signals, the process comprising the steps of:
   providing a light module with at least two light sources operated with on/off times, each light source comprising at least one LED;
   operating the at least two light sources with time-shifted on/off times to illuminate a target with a majority of light from the light sources; and
   detecting optical signals from the light sources after the optical signals have been reflected from the target, said detecting being performed with the light source that is in the off time at a given time.

2. A process in accordance with claim 1, further comprising:
   performing an analysis of the detected optical signals; and
   forming a correction factor (m−1) that is to be taken now into account with respect to the number (m) of light sources.

3. A process in accordance with claim 1, further comprising:
   performing an analysis of the detected optical signals; and
   forming a correction factor (1+1/V) that is to be taken now into account with respect to a pulse to pause ratio (V) of the on time and the off time.

4. A process according to claim 1, further comprising deploying the light module as a part of an operating room lighting fixture for an operating room.

5. A process in accordance with claim 1, wherein at any given time, one of the light sources of the light module is in the off time.

6. A light module comprising:
   at least two light sources operated with on/off times, each light source comprising at least one LED;
   at least one computer, which at least one computer operates the at least two light sources with time-shifted on/off times to illuminate a target with a majority of light from the light sources, and performs a detection of optical signals from the light sources after the optical signals have been reflected from the target, said computer detecting the optical signals with the light source that is in the off time at a given time.

7. A light module in accordance with claim 6, wherein a number (m) of light sources is provided as a function of a pulse to pause ratio (V) between the on time ($T_1$) and the off time ($T_0$), according to the following specification:

$$m=1+V, \text{ in which } V=T_1/T_0.$$

8. A light module in accordance with claim 7, further comprising at least one detection device, which amplifies, passes on and/or analyzes signals of the respective light module being used for the detection.

9. A light module in accordance with claim 8, wherein the detection device has at least one detection amplifier for amplifying the signals used for the detection.

10. A light module in accordance with claim 7, wherein the computer is designed to perform a correction of the detected optical signals, with respect to at least one of a summary brightness and a mean brightness of the light module.

11. A light module in accordance with claim 7, wherein the computer forms a correction factor (m−1) that is to be taken now into account with respect to the number (m) of light sources.

12. A light module in accordance with claim 7, wherein the computer performs an analysis of the detected optical signals and forms a correction factor (1+1/V) that is to be taken now into account with respect to a pulse to pause ratio (V) of the on time and the off time.

13. An operating room lighting fixture comprising:
   a light module comprising:
   a first light source comprising a light emitting diode;
   a second light source comprising a light emitting diode;
   a controller configured for:
      operating the light sources with on times and off times with at least one of the on times and the off times of the first light source shifted relative to the on times and the off times of the second light source;
      receiving signals from at least one of the light emitting diode of the first light source and the light emitting diode of the second light source during an off time thereof for a detection of optical signals with the light source;

at least one detection device, which amplifies, passes on and/or analyzes the received signals of the one of the light emitting diode used for the detection;

a switching device wherein the detection device has one detection amplifier in signal-communicating connection with the light sources via the switching device, wherein the controller is configured to switch the switching device according to a time an on/off time grid.

14. A light module comprising:
at least two light sources operated with on/off times, each light source comprising at least one LED;
at least one computer, which at least one computer operates the at least two light sources with time-shifted on/off times, and performs a detection of optical signals with the light source that is in the off time at a given time;
a number (m) of light sources is provided as a function of a pulse to pause ratio (V) between the on time ($T_1$) and the off time ($T_0$), according to the following specification:

$m = 1+V$, in which $V = T_1/T_0$;

at least one detection device, which amplifies, passes on and/or analyzes signals of the respective light module being used for the detection, the detection device having at least one detection amplifier for amplifying the signals used for the detection;
a switching device wherein the detection device has exactly one detection amplifier in signal-communicating connection with the light sources via the switching device.

15. A light module in accordance with claim 14, wherein the computer is designed to switch the switching device according to a time grid of the on/off times of the light sources.

16. A process for controlling the illumination of a target, the process comprising the steps of:
providing a plurality of light sources;
illuminating the target with light from the plurality of light sources, said illuminating including operating each of the light sources to have a plurality of on periods and off periods, said on and off periods being arranged to have one of the light sources be in the on period when another of the light sources is in the off period;
directing a majority of the light from the plurality of light sources towards the target;
receiving reflected light from the target at the plurality of light sources;
operating each of the light sources as a light detector during the off period of the respective light source;
measuring the reflected light at each of the light sources during the respective off periods;
varying an amount light from one of the plurality of light sources as a function of the measured reflected light.

17. A process in accordance with claim 16, wherein:
the plurality of light sources are part of an operating room lighting fixture.

18. A process in accordance with claim 16, wherein:
said operating of the plurality of light sources is arranged to have an off period occurring among the light sources at all times.

19. A process in accordance with claim 16, wherein:
a number of the plurality of light sources is represented by (m);
the measured reflected light is analyzed with a correction factor of (m−1).

20. A process in accordance with claim 16, further comprising:
determining a pulse to pause ratio (V) of the length of the on and off periods;
performing an analysis of the measured reflected light with a correction factor (1+1/V).

* * * * *